United States Patent [19]

Malinowski

[11] Patent Number: 4,837,433
[45] Date of Patent: Jun. 6, 1989

[54] APPARATUS FOR PROVIDING A PREDETERMINED SURFACE SCAN VELOCITY OF THE PROJECTED FIELD OF VIEW OF A SCANNING INSTRUMENT

[76] Inventor: Frank R. Malinowski, 1242 Dover La., Santa Barbara, Calif. 93103

[21] Appl. No.: 83,599

[22] Filed: Aug. 7, 1987

[51] Int. Cl.⁴ .......................... H01J 5/16; G02B 26/08
[52] U.S. Cl. ..................................... 250/236; 350/6.1; 74/55
[58] Field of Search ................ 356/216, 213; 250/236, 250/235, 334, 347, 578, 203 R; 358/109, 292, 293; 244/3.16; 350/6.1, 6.5, 6.6, 6.7, 6.8; 74/55, 59, 568 T, 569, 567

[56] References Cited

U.S. PATENT DOCUMENTS

| | | | |
|---|---|---|---|
| 2,263,333 | 11/1941 | Finch | 358/292 |
| 2,313,119 | 3/1943 | Brand | 250/235 |
| 2,919,624 | 1/1960 | Lindemann et al. | 250/236 |
| 3,862,423 | 1/1975 | Kutas et al. | 250/334 |
| 3,864,981 | 2/1975 | Schlegel | 74/55 |
| 3,991,789 | 11/1976 | Wojcikowski | 250/234 |

Primary Examiner—David C. Nelms
Assistant Examiner—Michael Messinger

[57] ABSTRACT

Apparatus is disclosed for providing a predetermined surface scan velocity of the projected field of view of a scanning instrument. The invention is adapted for use in a scanning instrument having scan drive means including an inertial element and detector means coupled to the inertial element for detecting or projecting radiation during a scan. The invention includes cam means mechanically coupled to said inertial element and supported, by a frame, to pivot therewith. The cam means includes a cam having a contour which is varied to provide a specific surface scan velocity profile for the projected field of view. A spring is coupled to the cam via a bearing which translates in response to the contour of the cam as the cam and the inertial element pivot during scan. The spring is attached to the frame to maintain the bearing in contact with the cam. The spring effectively stores energy from and restores energy to the inertial element via the bearing and the cam. The invention effectively transfers the kinetic energy of said inertial element to potential energy as said inertial element scans in a first direction and transfers the potential energy to kinetic energy as the inertial element scans in a second direction.

5 Claims, 2 Drawing Sheets

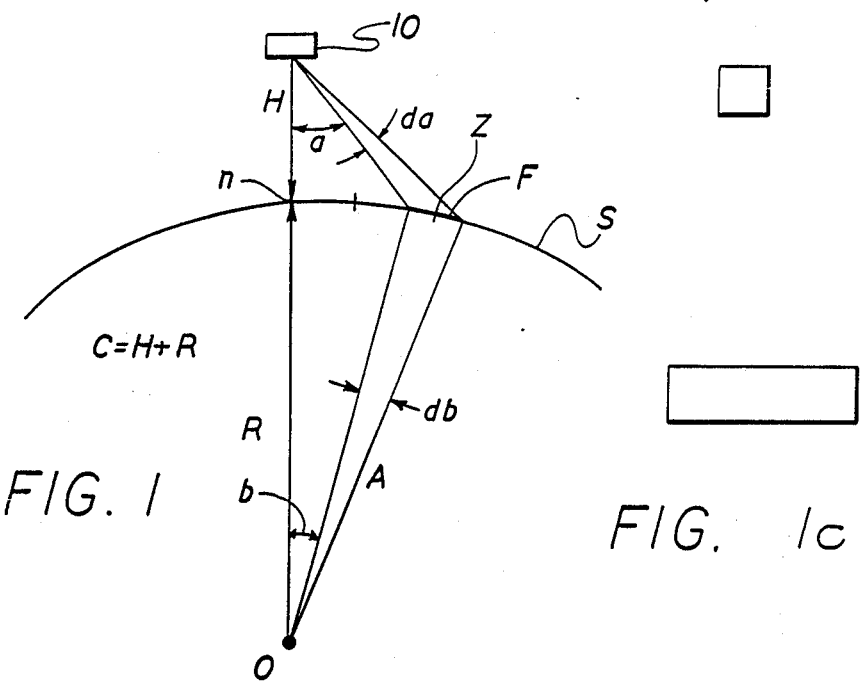
FIG. 1
FIG. 1b
FIG. 1c
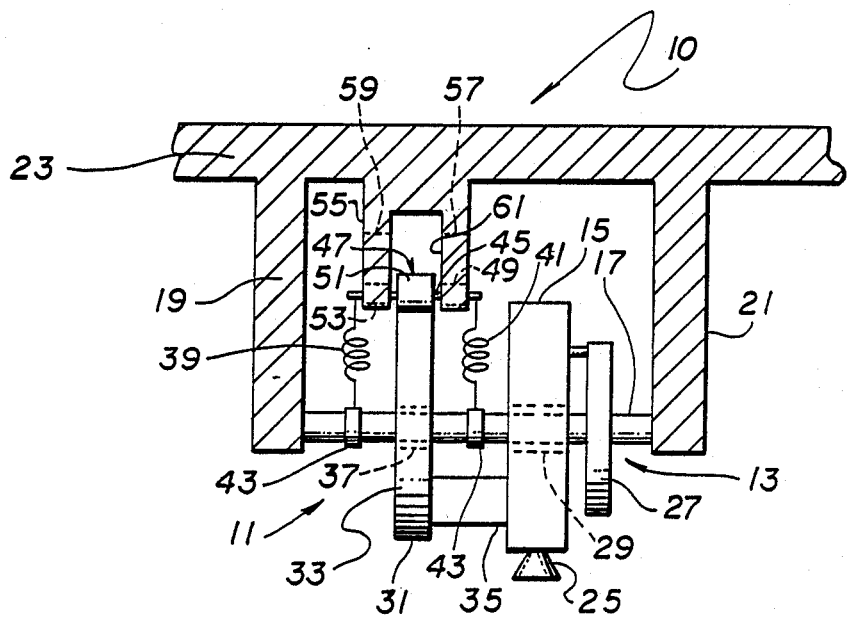
FIG. 2

APPARATUS FOR PROVIDING A PREDETERMINED SURFACE SCAN VELOCITY OF THE PROJECTED FIELD OF VIEW OF A SCANNING INSTRUMENT

BACKGROUND OF THE INVENTION

1. Field of the Invention:

The present invention relates to scanning radiometers and electro-optical systems. More specifically, the present invention relates to methods and apparatus for controlling the scan rate of scanning radiometers and electro-optical systems.

While the present invention is described herein with reference to illustrative embodiments for a particular application, it is understood that the invention is not limited thereto. Those of ordinary skill in the art having access to the teachings provided herein will recognize additional modifications, applications and embodiments within the scope thereof.

2. Description of the Related Art:

Radiometric resolution provides one measure of the performance of a scanning system. Radiometric resolution is defined as the amount of radiation that must be received by the system to produce an electrical signal equal to the system electrical noise. Wide-angle scanning systems will generally have a varying radiometric resolution over a scan line if the system does not have a surface scan velocity that provides a constant dwell time of the projected field of view at all scan angles. This variation in radiometric resolution generally imposes a significant constraint on the system in that the system must be designed so that its worse-case radiometric resolution meets the specified requirement. For example, a wide-angle scanning system scanning a typical range of plus or minus 56.25 degrees could require an increase in the aperture size by a factor of approximately 1.4 or an increase in the number of detectors used by a factor of approximately 2 if the surface scan velocity over the scan line is not designed to provide the optimum projected field of view dwell time. Such an increase in either the aperture size or the number of detectors would impose significant power, size, weight and cost requirements on the system.

Three well known methods of scan drive operation are: (1) constant angular rotation; (2) sinusoidal angular scan; and (3) constant surface velocity scan. Constant angular rotation systems, whether of the continuously rotating or the end-of-scan turnaround variety, provide optimum scan velocity only for systems that use a constant angular field of view over the scan line. Systems employing this technique are generally not as efficient as systems employing either of the other two techniques and offer poorer performance with respect to radiometric resolution (NEDT) and signal-to-noise ratio (S/N). (The footprint is the projection of the detector field of view onto the scan surface at an instantaneous scan angle.) In addition, systems employing this technique are not really adaptable to provide constant ground sample spacing of radiometric data over large scan angles for systems requiring this performance characteristic.

The sinusoidal angular scan drive technique typically provides oscillatory motion of a pivotally mounted dectector mechanism. This system is often utilized because it sustains the oscillatory scanning motion while requiring only the input of enough additional energy to overcome inherent frictional losses. The line-of-sight scan velocity of such systems is not constant, however. As a result, although sinusoidal angular scan drive systems are generally more efficient than constant angular rotation systems, the sinusoidal scan motion does not provide an optimum scan velocity for either the constant angular field of view of the constant footprint system designs.

Conventional constant surface velocity scanning systems utilize power drive mechanisms which input power to the scan drive system to continuously change the angular scan rate thereof in order to achieve a constant surface velocity scan for the projected field of view. Unfortunately, while generally offering superior performance, the power, cost, and weight associated with the power drive mechanisms of conventional constant surface velocity scanning systems, impose significant limitations on such systems.

Thus, there is a need in the art for an improved method and apparatus for providing constant or predetermined surface velocity for the projected field of view of scanning instruments which does not impose significant power and weight constraints on the system while offering constant radiometric resolution. There is a further need in the art for an apparatus which would provide a predetermined velocity profile of the projected field of view on a scanned surface.

SUMMARY OF THE INVENTION

The need in the art is addressed by the present invention which provides an apparatus for providing a predetermined surface scan velocity of the projected field of view of a scanning instrument. The invention is adapted for use in a scanning instrument having scan drive means including an inertial element and detector means coupled to the inertial element for detecting or projecting radiation during a scan. The invention includes cam means mechanically coupled to the inertial element and supported, by a frame, to pivot therewith. The cam means includes a cam having a contour which is varied to provide a specific surface scan velocity profile for the projected field of view. A spring is coupled to the cam via a bearing which translates in response to the contour of the cam as the cam and the inertial element pivot during scan. The spring is attached to the frame to maintain the bearing in contact with the cam. The spring effectively stores energy from the inertial element and restores energy to the inertial element via the bearing and the cam. The invention thereby transfers the kinetic energy of the inertial element to potential energy as the inertial element scans in a first direction and transfers the potential energy to kinetic energy as the inertial element scans in a second direction.

BRIEF DESCRIPTION OF THE DRAWINGS

FIG. 1a shows the geometry of a typical operational environment of a radiometer or other electro-optical scanning system in which the present invention may be utilized.

FIG. 1b provides a top view of the projected field of view of the scanning instrument of FIG. 1a at the nadir position.

FIG. 1c provides a top view of the projected field of view of the scanning instrument of FIG. 1a at the end of scan position.

FIG. 2 is a side view of a sinusoidal scan drive mechanism with an illustrative implementation of cam driven spring arrangement of the present invention.

DESCRIPTION OF THE INVENTION

Figure 3:
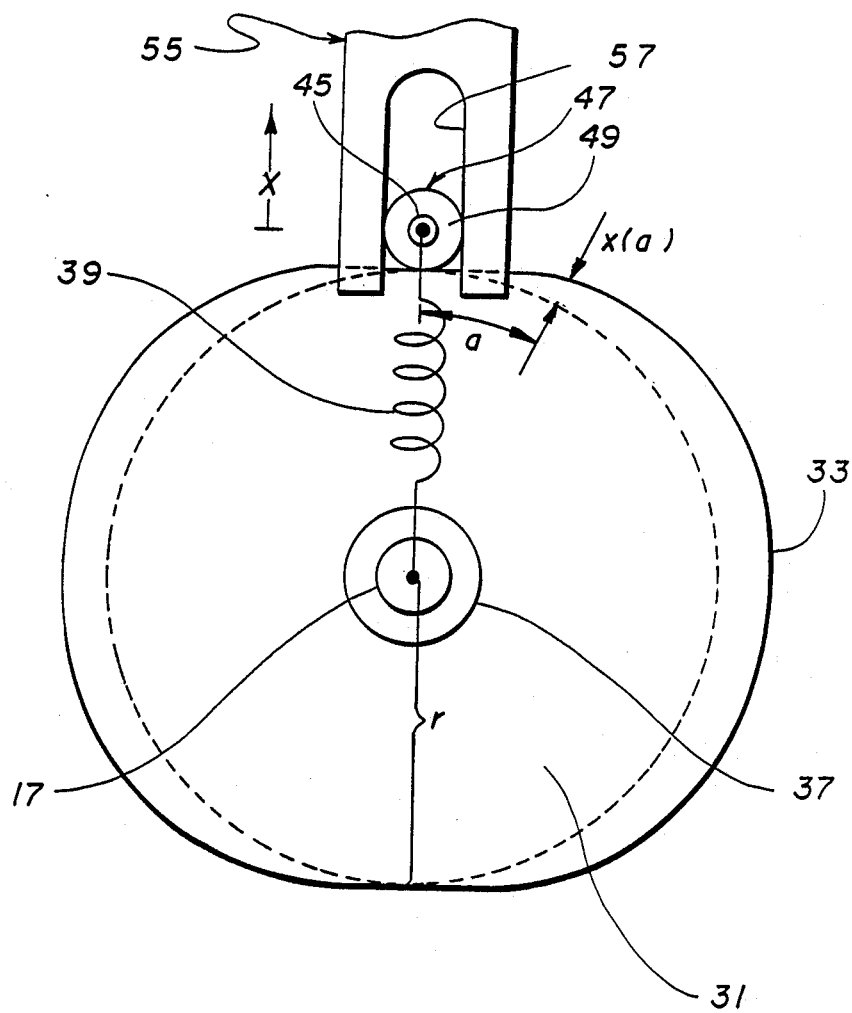
FIG. 3 is a side view of the illustrative embodiment of the cam driven spring arrangement of the present invention.

The purpose and function of the present invention is to provide wide-angle scanning instruments with a constant or predetermined surface scan-velocity profile for the projected field-of-view (footprint) without having to supply power (other than for losses due to friction) to the scan drive system to control the angular scan rate thereof. The invention is described herein with reference to an oscillating scan drive system that normally provides sinusoidal scan drive motion or other similar motion. Nonetheless, it is understood that the invention is not limited thereto. Those skilled in the art will recognize that the principles of the present invention, as taught herein, may be extended to other scan drive systems as well.

Sinusoidal scan drive mechanisms are advantageous in that minimal power is required to overcome frictional forces in the scan drive. Oscillatory motion is thus sustained by a spring mechanism which effectuates a back and forth transfer of kinetic energy to potential energy. As mentioned above, however, the angular scan rate associated with the sinusoidal motion does not provide a constant surface scan velocity for the projected field of view. As as result, these systems will typically have varying radiometric resolution over a scan line. As mentioned above, this variation in radiometric resolution generally imposes a significant constraint on the system in that the system must be designed so that its worse-case radiometric resolution meets a specified system requirement.

Control of the angular scan rate associated with the scanning motion of the conventional electro-optical scanner is provided by the present invention which adds an additional energy transfer mechanism. The present invention is effective to remove and resupply energy to the scan drive in a precise manner and rate so that the scan motion is sustained and the desired surface scan velocity profile of the projected field of view is achieved. The invention obviates the necessity to provide additional power to the scan drive other than that required to overcome frictional forces.

The invention will become apparent from the following description taken in conjunction with the attached drawings. FIG. 1a shows a typical application for a radiometer or other electro-optical angularly scanning detection system 10. The detection system 10 may be mounted on a satellite or an aircraft (not shown) such that it is positioned at an altitude H above a target surface S of a body having a radius of curvature R. The detection system 10 is typically adapted to scan within a positive and negative scan angle 'a'. The scan angle is measured with respect to a line projected from the system 10 to the nadir at point 'n' on the surface S.

The instantaneous field of view of the detectors of the system 10 project a footprint F onto the surface S which generally covers a minimum area and provides a maximum spatial resolution at the nadir 'n'. Using the teachings of the related art, the footprint may cover a maximum area with minimum spatial resolution at the end of scan position 'z' or by appropriate system design may be made to cover the same size area and have the same spatial resolution as the nadir position. The end of scan position 'z' occurs at the maximum scan angle $a_{max}$, which is typically on the order of 56 degrees. Top views of the surface S showing the footprint F at the nadir position of point 'n' and at the end of scan position at point 'z' are shown in FIGS. 1b and 1c respectively. The dimension of the footprint in the scan direction may be determined as follows.

Since, in general, $$A/\sin a = B/\sin b = C/\sin c \qquad [1]$$

where 'a', 'b', and 'c' are the interior angles of the inner triangle of FIG. 1a and A, B, and C are the opposing sides respectively (where $C=H+R$), then $$b = 180 - (c+a) \qquad [2]$$

in degrees and $$c = \sin^{-1}((C \times \sin a)/R). \qquad [3]$$

Therefore $$b \times f(a) = 180 - (\sin^{-1}(H+R)(\sin a)/R) + a) \qquad [4]$$

Since the footprint F can be determined by the reaction:

$$F = R \times db \qquad [5]$$

where $db$ is the angular width of the footprint with respect to the point O, and since $db = (df(a)/da) \times da$, $$F = R \times (df(a)/da) \times da. \qquad [6]$$

Substituting and using standard principles yields, $$F = R[(H+R)(\cos a)/R)/[1-((H+R)(\sin a)/R)^2]^{\frac{1}{2}} - 1]da \qquad [7]$$

As the ground velocity $V_g$ of the footprint F is:

$$V_g = R \times db/dt$$

and from equation [5]

$$V_g = F/dt \qquad [8]$$

then $$V_g = R[((H+R)(\cos a)/R)/[1-((H+R)(\sin a)/R)^2]^{\frac{1}{2}} - 1]\dot{a} \qquad [9]$$

where the angular scan rate $\dot{a} = da/dt$.

Thus, the angular scan rate a required to achieve a predetermined surface scan velocity can be expressed by the following equation:

$$\dot{a}_D = V_g/R[((H+R)(\cos a)/R)/[1-((H+R)(\sin a)/R)^2]^{\frac{1}{2}} - 1] \qquad [10]$$

The angular scan rate $\dot{a}_{SHM}$ provided by an instrument using simple harmonic motion can be expressed as follows:

$$\dot{a}_{SHM} = D \cos(\sin^{-1}(a/M)) \qquad [11]$$

where
D is the desired angular scan rate at the nadir scan angle,
a is the scan angle, and
M is a constant determined by the peak angular amplitude of the simple harmonic motion.

When the system is designed so that $D = V_g/R$, at the nadir scan angle (a = 0 degrees), the angular scan rate required to achieve a predetermined surface scan velocity $\dot{a}_D$ is equal to the angular scan rate for simple harmonic motion $\dot{a}_{SHM}$. For any other scan angle, $\dot{a}_{SHM}$ is made to be greater than $\dot{a}_D$ by the proper selection of M. Therefore, as the line-of-sight of the instrument 10 moves away from the nadir position, kinetic energy must be removed from the oscillating system to slow the scan rate down to achieve the desired scan rate. Since in general, the kinetic energy KE is related to the angular scan rate as follows:

$$KE = I\dot{a}^2/2 \quad [12]$$

the magnitude of the total kinetic energy that must be removed in going from the nadir position to any angle 'a' is:

$$\text{delta } KE = I(\dot{a}_{SHM}^2 - \dot{a}_D^2)/2 \quad [13]$$

where I is the moment of inertia of the scan drive system.

As disclosed herein, the cam driven spring arrangement of the present invention provides the means for transferring kinetic engery to and from potential energy rates to satisfy eq. [13] to achieve not only a constant surface scan velocity profile for the projected field-of-view, but also for a more general, wide range of predetermined surface scan velocity profiles, eq. [12].

The cam driven spring attachment of the present invention is disclosed in FIGS. 2 and 3. FIG. 2 shows a side view of the cam driven spring arrangement of the present invention 11 mounted in a simplified conventional sinusoidal scan drive mechanism 13. The scan drive mechanism 13 includes an inertial element 15 mounted for pivotal movement about a stationary shaft 17 (through bearings shown in phantom at 29). The shaft 17 is supported within two extensions 19 and 21 of a frame 23 which is in turn attached to or integral with the instrument 10. A detector 25 (typically comprising array of detector elements or a scan mirror) is attached to the inertial element 15. A torsion coil spring 27 is attached at one end to the shaft 17 and at the other end to the inertial element 15. In the absence of the cam-driven spring arrangement of the present invention, the spring 27, in conjunction with the inertial element 15, produces continuous sinusoidal motion so long as additional energy is added periodically to overcome the frictional forces associated with the rotation of the inertial element 15 about the shaft 17.

The cam driven arrangement 11 of the present invention includes an annular cam 31 having a peripheral surface 33 variably contoured in the manner discussed more fully below. (See FIG. 3) The cam may be fabricated of plastic, metal, metal alloy or other suitably rigid material. The cam is rigidly attached to the inertial element 15 by an arm 35 to pivot or rotate therewith about the shaft 17 on bearings 37 shown in phantom. A set of springs 39 and 41 are attached to the shaft 17 by clasps or connectors 43. The opposite ends of the springs 39 and 41 are connected to the ends of a second shaft 45 which is mounted substantially parallel to the first shaft 17. A bearing assembly 47 is mounted on the second shaft 45 at the periphery 33 of the cam 31. The assembly 47 includes three bearings 49, 51, and 53. The first and third bearings 49 and 53 are shown in phantom in FIG. 2. The center bearing 51 is positioned on the shaft for peripheral engagement with the cam 31 at the contoured surface 33 thereof. As may be appreciated from the side view of FIG. 3, as the cam 31 rotates, the bearing assembly 47 is displaced vertically a distance 'x' by the variable contour of the cam 31. The springs 39 and 41 retain the bearing assembly 47 in place on the peripheral edge 33 of the cam 31. A third extension 55 of the frame 23 provides a set of channels or tracks 57 and 59 within which the first and third bearings 49 and 53 translate as the second bearing 49 translates in response to the cam 31. See FIG. 2. As shown in FIG. 3, a slot 61 is cut in the third frame extension 55 to receive the contoured peripheral edge 33 of the cam 31. See FIG. 3.

As the bearing assembly 47 undergoes linear translation a distance 'x' in response to the movement of the cam 31, the matching springs 39 and 41 will be extended or stretched a corresponding distance 'x'. Thus, as the inertial element 15 scans such that the cam 31 moves off the nadir position, kinetic energy associated with this motion will be transferred to potential energy stored in the springs 39 and 41. As the mechanisms 11 and 13 continue to scan the springs continue to stretch until the kinetic energy of the mechanisms 11 and 13, at the nadir position, is transformed and stored as potential energy in the coil spring 27 of the sinusoidal scan drive and springs 39 and 41 of the present invention. This then is the end of scan position. Thereafter, the direction of motion is reversed and the potential energy in the springs 27, 39 and 41 is returned to the cam 31 and the inertial element 15 as kinetic energy at the reverse rate at which it was stored.

The magnitude of the potential energy PE stored in the springs 39 and 41 is:

$$PE = Kx^2(a)/2 \quad [14]$$

where K is the spring constant of the springs 39 and 41 combined.

In addition, the magnitude of the kinetic energy that must be removed from the sinusoidal motion to produce the desired oscillatory motion needs to be equal to the potential energy stored in springs 39 and 41 at all scan angles if continuous oscillatory motion is to be achieved (with energy being added only to compensate for energy dissipated by frictional forces). Thus, at all scan angles, $$PE = \text{delta } KE$$

so from equations [13] and [14], $$Kx^2(a)/2 = I(\dot{a}_{SHM}^2 - \dot{a}_D^2)/2 \quad [15]$$

Solving for x(a) yields:

$$x(a) = [I(\dot{a}_{SHM}^2 - \dot{a}_D^2)/K]^{\frac{1}{2}} \quad [16]$$

where x(a) is both the displacement of the springs 39 and 41 and the contour of the cam with reference to a base radius 'r', as a function of the scan angle 'a'. That is, the total contour of the cam is $TC(a) = r + x(a)$.

Thus, when the contour of the peripheral edge 33 of the cam 31 is such that it satisfies equation [16], a desired optimum surface scan velocity of the projected field of view of the detector array 25 may be achieved.

Those skilled in the art will appreciate that the curvature of the peripheral edge 33 of the cam 31 should not be sharper than the radius of the bearing 49. That is, the bearing 49 should touch the cam 31 at only one point at a time. Thus, there may be a tradeoff between the size of the bearing 49, relative to the curvature of the cam 31, and the degree of conformance that can be acheived in providing the desired surface scan velocity at every scan angle over the scan line.

For nonsinusoidal scan drive systems, in the absence of the restoring and peak-amplitude limiting torsion spring, some form of scan stop mechanism must be provided. One approach would be to provide a bumper stop arrangement between the cam 31 and the frame 23. This would permit the springs 39 an 41 of the cam driven spring arrangement 11 to be used at the complete energy transfer mechanism (rather than in conjunction with the the torsion spring 27).

Another technique for limiting scan in nonsinusoidal scan drive systems would be to change the shape of the cam so that springs 39 and 41 served to also limit the scan range. Again, this would permit a further simplification of the system by eliminating the spring 27 in favor of stronger springs 39 and 41.

Thus, the present invention has been described herein with reference to a particular embodiment for a particular application. Those skilled in the art will recognize additional modifications, applications and embodiments within the scope thereof. For example, having described a constant surface scan velocity embodiment of the invention with reference to a sinusoidal scan drive, those skilled in the art will appreciate that any surface scan velocity profile may be provided for sinusoidal as well as nonsinusoidal scan drive systems by changing the contour of the cam 31 to satisfy the more general equation [12] above as modified to accommodate the equations of motion for the desired velocity profile.

It is intended by the appended claims to cover any and all such applications modifications and embodiments within the scope of the invention.

Accordingly, what is claimed is:

1. Apparatus for providing a predetermined surface scan velocity of the projected field of view of a scanning instrument, said scanning instrument including a frame and scan drive means attached thereto, said scan drive means including an inertial element and detector means coupled to said inertial element for detecting or projecting radiation during a scan, said apparatus comprising:
   cam means mechanically coupled to said inertial element and supported by said frame, to pivot therewith, said cam means including a cam having a variable contour and
   bearing means for displacing a spring means in response to the variable contour of said cam as said cam and said inertial element pivot during said scan,
   said spring means coupling said bearing means to said frame for storing energy from and for restoring energy to said inertial element via said bearing means and said cam means;
   whereby said apparatus is effective to transfer the kinetic energy of said inertial element to potential energy as said inertial element scans in a first direction and to transfer said potential energy to kinetic energy as said inertial element scans in a second direction.

2. The invention of claim 1 wherein the cam is contoured to provide a predetermined surface scan velocity profile for the projected field of view of said scanning instrument.

3. The invention of claim 2 wherein said bearing means engages said contoured peripheral surface of said cam such that the position of said bearing means is a function of the instantaneous angular position of said inertial element.

4. An improved scanning instrument comprising:
   a scan drive mechanism with an inertial element pivotally attached to a frame;
   detector means mechanically coupled to said scan drive means and having a field of view on a target surface for detecting or projecting electromagnetic radiation; and
   apparatus for regulating said scan drive means as a function of instantaneous scan angle to provide a projected field of view with a constant surface scan velocity including:
   a cam mechanically coupled to said inertial element and adapted to pivot therewith, said cam having a contoured peripheral surface;
   bearing means mechanically coupled to the contoured peripheral surface of said cam for providing linear translation in response to the contour of said cam as said cam and said inertial element pivot during scan; and
   spring means coupling to said bearing means to said frame for transferring the kinetic energy of said scan drive means to potential energy as said scan drive means scans in a first direction and for transferring said potential energy to kinetic energy as said scan drive means scans in a second direction.

5. A method for regulating a scan drive mechanism to provide a predetermined instantaneous scan velocity of a projected field of view on a target surface, said method including the steps of:
   (a) determining the desired scan velocity profile as a function of scan angle;
   (b) coupling a cam contoured in accordance with said desired velocity profile to said scan drive mechanism to pivot therewith;
   (c) operatively coupling bearing means to the said cam at the variable contour thereof for providing linear translation in response to the variable contour of said cam as said cam and said scan drive mechanism pivot during said scan; and
   (d) mechanically coupling spring means to said bearing means and to said frame to transfer the kinetic energy of said scan drive means to potential energy as said scan drive means scans in a first direction and to transfer said potential energy to kinetic energy as said scan drive means scans in a second direction.

* * * * *